(No Model.)

W. J. WEBSTER.
HOISTING APPARATUS.

No. 596,836. Patented Jan. 4, 1898.

WITNESSES:
Otto Spieth
Isaac B. Ewing

INVENTOR
W. J. Webster
BY
ATTORNEYS.

UNITED STATES PATENT OFFICE.

WILLIAM J. WEBSTER, OF OAKDALE, PENNSYLVANIA.

HOISTING APPARATUS.

SPECIFICATION forming part of Letters Patent No. 596,836, dated January 4, 1898.

Application filed May 4, 1897. Serial No. 635,001. (No model.)

*To all whom it may concern:*

Be it known that I, WILLIAM J. WEBSTER, of Oakdale, in the county of Allegheny and State of Pennsylvania, have invented a new and Improved Hoisting Apparatus, of which the following is a full, clear, and exact description.

This invention is an improvement in hoisting apparatus of that class which is particularly adapted for use in connection with the drilling of wells, the characteristic feature being a continuously-driven shaft and means by which the hoisting-drum may be readily thrown in and out of gear with the shaft.

This specification is the disclosure of one form of my invention, while the claim defines the actual scope of the conception.

Reference is to be had to the accompanying drawings, forming a part of this specification, in which similar characters of reference indicate corresponding parts in all the figures.

Figure 1:
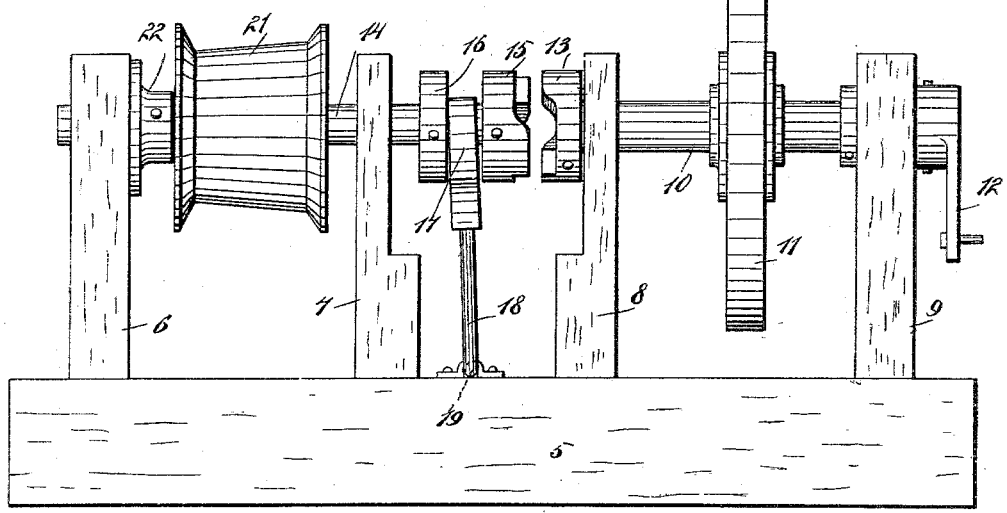
Figure 3:
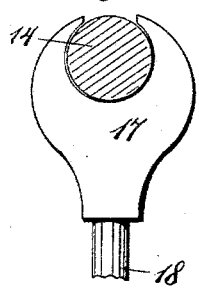
Figure 4:
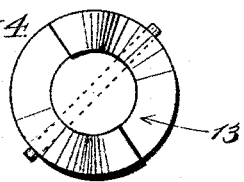
Figure 2:
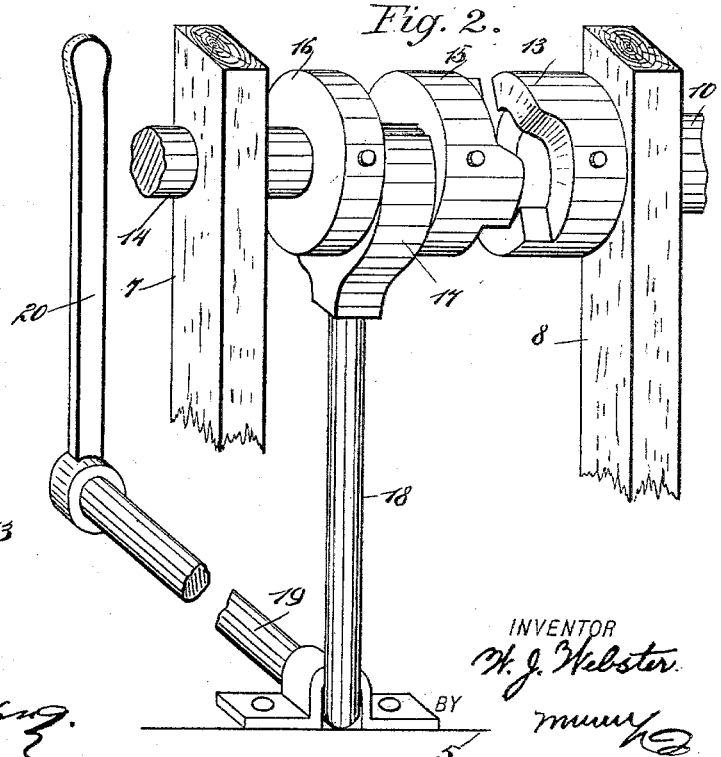

Figure 1 is a side elevation of the invention. Fig 2 is a fragmentary perspective view of the clutch devices. Fig. 3 is a detail section showing the operating-fork thereof, and Fig. 4 is a face view of one of the clutch members.

On the base 5 stand four posts 6, 7, 8, and 9. Journaled in the posts 8 and 9 is a primary-movement shaft 10, having a band-wheel 11, by which the shaft is driven. If desired, power may be applied through a crank-arm 12. The inner end of the shaft 10 carries a clutch member 13.

Revolubly and slidably held by the posts 6 and 7 and in longitudinal alinement with the shaft 10 is a shaft 14. The inner end of the shaft 14 has a clutch member 15 fixed thereon. The clutch member 15 coacts with a collar 16 to form a groove wherein the clutch-operating fork 17 of the arm 18 is located. The arm 18 is fixed to a rock-shaft 19, carried on the base 5. The rock-shaft 19 has an operating-lever 20, whereby the shaft may be moved to swing the arm 18 to engage or disengage the clutch member 15 from the clutch member 13, the shaft 14 moving with the clutch member 15.

Fixed to the shaft 14, between the posts 6 and 7, is a winding-drum 21 for the hoisting line or cable. Also fixed to the shaft 14, adjacent to the post 6, at the inner side thereof, is a collar 22, that engages the post 6 when the clutch member 15 is disengaged from the clutch member 13, whereby to form a brake to restrain the movement of the shaft 14 when the clutch members are not engaged. Therefore when it is desired to stop the winding of the drum 21 the arm 20 is shifted to throw the clutch member 15 out of engagement with the clutch member 13. Simultaneously with this operation the brake-collar 22 is engaged with the post 6 and the revolution of the drum 21 is stopped.

In the use of my device it is also entirely practical to attach it to the engine-shaft, and this method of use may be preferable in some cases and would give the advantage of greater speed.

Various changes in the form, proportion, and minor details of my invention may be resorted to without departing from the spirit and scope thereof. Hence I do not consider myself limited to the precise construction herein shown, but am entitled to all the variations coming within the scope of the claim.

Having thus described my invention, I claim as new and desire to secure by Letters Patent—

The combination of a plurality of alined stationary bearings, two shafts revolubly mounted in the bearings and longitudinally alined with each other, one of the shafts being slidable in its bearings, clutch members respectively carried by the contiguous ends of the shafts and engaged and disengaged by the sliding movement of said slidable shaft, means for imparting a sliding movement to said slidable shaft, and a brake-collar fixed on said slidable shaft and moving with the same to engage one of the bearings upon the disengagement of the clutch members.

WILLIAM J. WEBSTER.

Witnesses:
ELMER E. FULMER,
L. J. MCMILLEN.